United States Patent [19]

Elman et al.

[11] Patent Number: 4,783,136
[45] Date of Patent: Nov. 8, 1988

[54] OPTICAL WAVEGUIDES AND METHODS FOR MAKING SAME

[75] Inventors: Boris S. Elman, Brighton; Mrinal K. Thakur, Waltham; Robert J. Seymour, Wellesley, all of Mass.

[73] Assignee: GTE Laboratories Incorporated, Waltham, Mass.

[21] Appl. No.: 852,864

[22] Filed: Apr. 16, 1986

[51] Int. Cl.[4] .......................... B05D 3/06; G02B 6/10; G02B 6/00
[52] U.S. Cl. .................................. 350/96.12; 427/38; 427/44; 350/96.34
[58] Field of Search ..................... 427/54.1, 44, 36, 38; 350/96.12, 96.34

[56] References Cited

U.S. PATENT DOCUMENTS

| | | | |
|---|---|---|---|
| 4,220,747 | 9/1980 | Prezios et al. | |
| 4,431,263 | 2/1984 | Garito | 350/96.34 |
| 4,465,336 | 8/1984 | Huber et al. | |
| 4,497,535 | 2/1985 | Winful et al. | |
| 4,515,429 | 5/1985 | Smith et al. | 350/96.13 |
| 4,531,809 | 7/1985 | Carter et al. | 350/96.12 |
| 4,536,450 | 8/1985 | Garito | 428/520 |
| 4,615,962 | 10/1986 | Garito | 427/53.1 |
| 4,691,982 | 9/1987 | Nishimura et al. | 350/96.15 |

Primary Examiner—Norman Morgenstern
Assistant Examiner—Marianne L. Padgett
Attorney, Agent, or Firm—Ivan L. Ericson

[57] ABSTRACT

An optical waveguide made from a unitary organic film has a polydiacetylene core region and a diacetylene monomer cladding substrate region. The index of refraction of the polydiacetylene core region is greater than the index of refraction of the diacetylene monomer cladding substrate region.

The method of fabricating the optical waveguide comprises depositing a diacetylene monomer film on a substrate. The diacetylene monomer film is polymerized by ion beam bombardment to a depth less than the thickness of the film. The depth of the polymerization is controlled by the ion mass and energy of the ion beam applied.

10 Claims, 2 Drawing Sheets

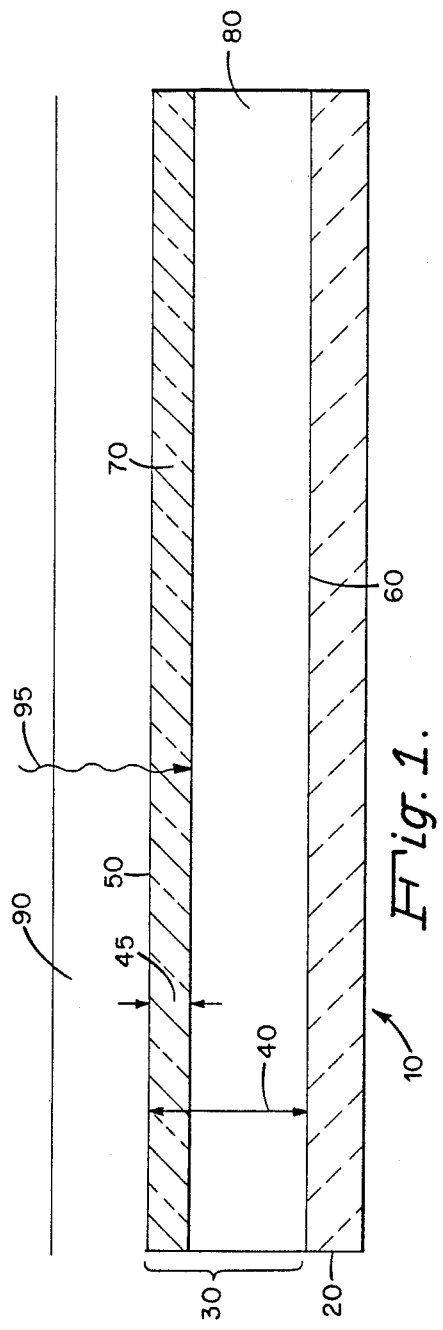
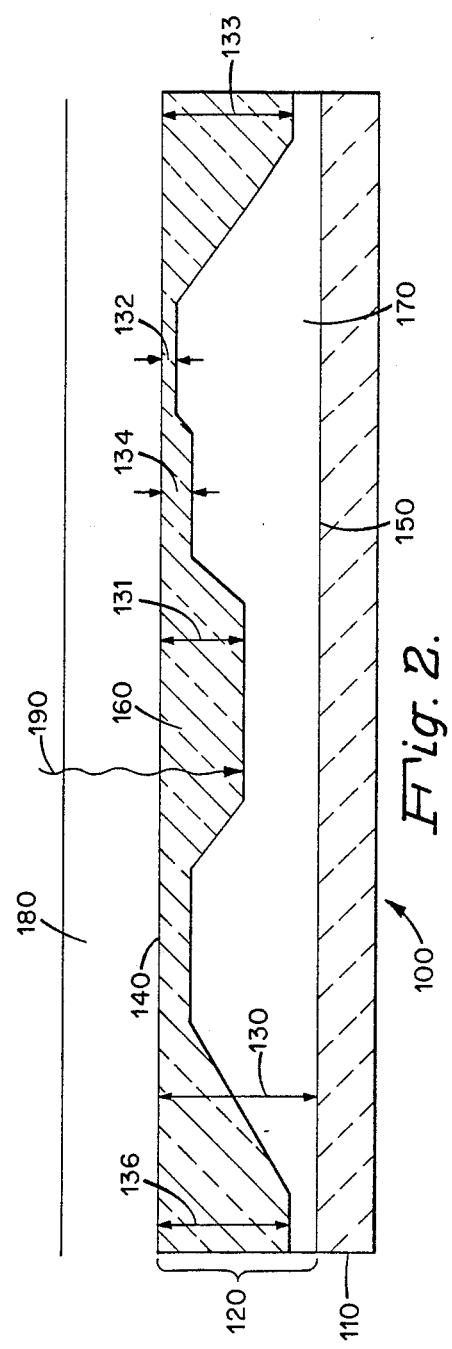

OPTICAL WAVEGUIDES AND METHODS FOR MAKING SAME

FIELD OF THE INVENTION

The invention is related to an optical waveguide and the fabrication thereof. More particularly, this invention relates to optical wave guides made from an organic film and the use of ion beams to control the polymer thickness of the organic film.

BACKGROUND OF THE INVENTION

Polydiacetylenes have been of interest in nonlinear optics for the very high values of their third-order susceptibilities $\chi^3(\omega)$ and it has been suggested that these materials be used in all-optical signal processing schemes based on intensity-dependent index of refraction $n_2$ (proportional to $\chi^3(\omega)$). U.S. Pat. No. 4,431,263 to Garito discusses the use of diacetylene species and polymers formed therefrom to provide nonlinear optic waveguide materials and U.S. Pat. No. 4,220,747 to Prezios et al. discusses crystalline diacetylene polymers as being useful as photoconductive materials.

The ability to generate, guide, modulate, and detect light in thin film configurations (thickness comparable to the wavelength) opens up possibilities for monolithic "optical circuits". It is important to emphasize that ability to form waveguides in different materials is crucial in further investigations and developments in the area of "integrated optics".

Polydiacetylenes are formed by a solid state reaction of adjacent monomer units in diacetylene single crystals which can be grown by a variety of approaches in desired macroscopic forms. Diacetylene obtained in the form of thin film single crystals and in the form of multilayer assemblies can be made using novel growth techniques, M. Thakur and S. Meyler, Macromolecules, 18, 2341 (1985); and Langmuir-Blodgett film balance respectively, or as well as other techniques. The solid state reaction of diacetylene monomers can be initiated by UV irradiation, heat, pressure, or high energy gamma-rays and results in single crystals of macroscopic planar dimensions up to a few centimeters. During all polymerization procedures mentioned above, polymerization of the total volume of material with no control of the thickness of the polymerized part is taking place.

Several conditions are required in order for an optical waveguide to be formed:
  The thickness of the film representing the waveguide has to be well controlled.
  The index of refraction of the film representing the waveguide ($n_f$) must be larger than indices of refraction of the substrate ($n_s$) and the cover ($n_c$).
  Uniform interface between the film and the substrate provides better conditions for propagation of light in a waveguide.

Fabrication techniques that are used for making optical waveguides can be roughly classified into two types: in the first one a thin transparent layer is grown on a substrate of less refractive index; in the second, transparent substrate is submitted to some physical process, such as chemical diffusion or ion implantation, which increases its refractive index, as compared to the substrate.

The principle of ion implantation is rather simple. A collimated ion beam of well defined energy is sent into the substrate where an optical waveguide is to be formed. Most modifications to the substrate introduced by ion beams and discussed in the literature are related to the following physical phenomena:
  radiation damage
  formation of donor and acceptor energy levels
  stoichiometric changes of the substrate.

Ion implantation is well adapted for making channel waveguides when for example helium, protons or lithium ions are used during implantation, and waveguides have been successfully made in fused quartz, lithium niobate, GaAs and ZnTe.

SUMMARY OF THE INVENTION

In accordance with one aspect of the present invention a new and improved optical waveguide comprises a unitary organic film. The unitary organic film has a first surface, a second surface, a thickness, a first region and a second region. The first region is a polydiacetylene film and the second region is a diacetylene monomer film, and the first region is contiguous with the second region.

In accordance with another aspect of the present invention, a new and improved method for making an optical waveguide comprises the following steps:

Step 1. A diacetylene monomer film is deposited on a substrate. The film has a thickness and a surface.

Step 2. The diacetylene monomer film is polymerized by ion beam bombardment to a predetermined depth less than the thickness of the monomer film. The ion beam is characterized by an ion mass and an accelerating voltage (energy). And the predetermined depth of the polymerization is controlled by the ion mass and the energy of the ion beam applied.

BRIEF DESCRIPTION OF THE DRAWING

In the drawing:

FIG. 1 is a cross sectional representation of a waveguide in accordance with the present invention.

FIG. 2 is a cross sectional representation of another waveguide depicting another aspect of the present invention.

Figure 3:
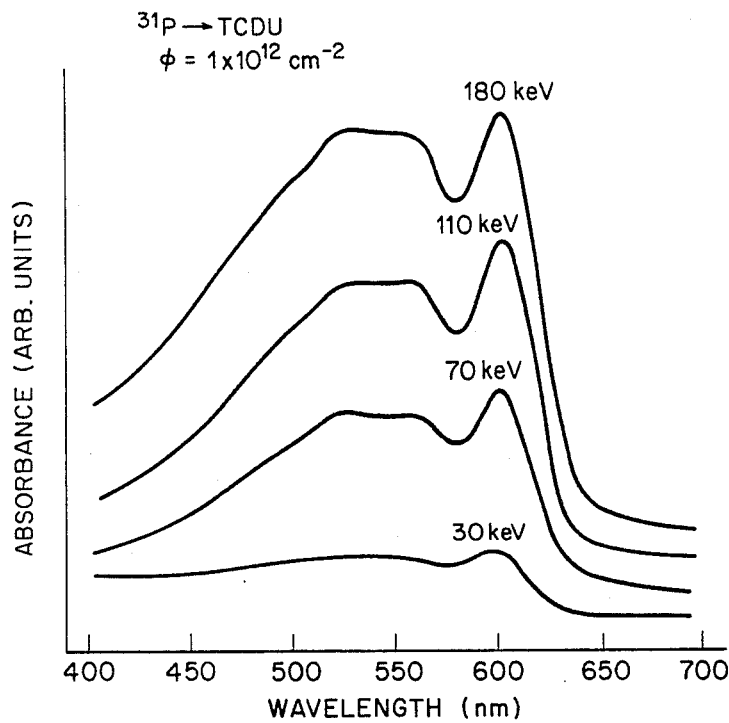
FIG. 3 is a curve of optical absorption data of TCDU (bis-phenylurethane of 5,7-dodecadiyne-1,12-diol) monomer films polymerized by ion beams in accordance with the present invention.

For a better understanding of the present invention together with other and further objects, advantages and capabilities thereof, reference is made to the following disclosure and appended claims in connection with the above-described drawing.

DETAILED DESCRIPTION OF THE INVENTION

Referring to FIG. 1 of the drawing an optical waveguide 10 has a substrate 20, a unitary organic film 30 which has a thickness 40, a first surface 50, a second surface 60, a first region 70 comprising an organic polymer such as polydiacetylene, a second region 80 comprising a monomer of the polymer of first region 70, such as a diacetylene monomer. A medium 90 such as a gas, vacuum, or a coating of a material which has an index of refraction less than the first index of refraction of first region 70 and is in contact with the first surface 50 of unitary organic film 30. The thickness 45 of the first region can be varied by controlling the ion mass and the accelerating voltage (energy) of an ion beam 95 which is used to polymerize the unitary organic film 30 to a predetermined depth to form first region 70 leaving the second region 80 unpolymerized.

Optical waveguide 10 is made by depositing an organic film such as a diacetylene monomer on substrate 20 forming diacetylene monomer film having a thickness 40 of about one to about 10 microns.

The diacetylene monomer is polymerized to a predetermined depth 45 by the ion beam 95 bombardment at the surface 50. The depth of polymerization is controlled by the ion mass and beam energy applied to the surface 50 of the deposited film as discussed in Example 1.

The controlled polymerization to a given depth forms first region 70 of the unitary organic film 30. The remaining unpolymerized monomer forms second region 80 of unitary organic film 30.

The diacetylene monomer second region 80 corresponds to a cladding substrate and the polydiacetylene first region 70 corresponds to the core of a waveguide and their indices of refraction satisfy the requisite relationship for a waveguide in which the index of refraction of the core (first region 70) is greater than the index of refraction of the cladding substrate (second region 80) and the index of refraction of the medium 90. Furthermore, the index profile obtained in case of ion beam induced polymerization would be much closer to the uniform waveguide profile (steplike interface) when compared to diffused waveguides (exponential depth profile).

Moreover, patterning (exposure to the ion beam of only a certain region of the sample in planar dimensions) can be easily utilized during the ion beam induced process of polymerization leading to the possibility of channel waveguide formation and fabrication of structures of interest such as gratings and Y-couplers.

In FIG. 2, an optical waveguide 100 has a substrate 110, a unitary organic film 120 which has a thickness 30, a first surface 140, a second surface 150, a first region 160, and a second region 170. A medium 180 which has an index of refraction less than the index of refraction of the first region 160 is in contact with the first surface 140 of the unitary organic film 120. The thickness of the polydiacetylene first region 160 can be varied at predetermined locations by varying the mass and energy of ion beam 190. The ion beam 190 polymerizes the diacetylene monomer of the unitary organic film 120 to a polydiacetylene polymer to form first region 160 of unitary organic film 120 at a controlled depth. One can vary the depth of the polymerization at predetermined locations forming a first region 160 having varying thicknesses such as 131, 132, 133, 134, 135 and 136 depicted in FIG. 2, or a uniform step-like thickness variation to form a grid pattern.

EXAMPLE 1. Ion beam induced polymerization of thin film TCDU (bis-phenylurethane of 5,7-dodecadiyne-1,12-diol) monomers using 150 keV arsenic and phosphorus ion beams at fluence of $1 \times 10^{12}$ cm$^{-2}$ The absorption spectroscopy data in the visible range and polarization behavior of Raman spectra clearly indicate that highly anisotrophic crystalling polymeric films were formed during the ion bombardment of thin film TCDU monomers at the conditions indicated above. TCDU samples polymerized by $^{31}$P beam show much higher absorption than samples polymerized by an $^{75}$As beam. This is caused by the deeper penetration of the lighter $^{31}$P ion beam. Considering the thicknesses of polymerized layers to be equal to penetration depths ($R_p$) of $^{31}$P and $^{75}$As ions at 150 keV (2570 Å and 1200 Å, respectively) yields an absorption coefficient of $5 \times 10^4$ cm$^{-1}$ in the absorbing region ($<605$ nm) with low losses at longer wavelength ($\lambda > 630$ nm).

EXAMPLE 2. Refractive index measurements of samples

Refractive index measurements of thin TCDU films polymerized by ion beams are greatly complicated. At the same time these measurements are performed (relatively easy) on bulk TCDU-PDA's polymerized by high energy gamma-irradiation. The measurements of the refractive index show that the value of $n_\parallel$ (parallel to the chain direction) for TCDU-PDA measured at 6328 Å is approximately $n_\parallel \simeq 2.2$, whereas, as it is known, the refractive index for TCDU monomer is approximately 1.65, thus criterion relating to refractive indicies for propagation of a guided mode can be satisfied by ion beam induced formation of thin film polymer on a parent monomer substrate.

EXAMPLE 3. Ion beam induced polymerization of thin film TCDU monomers using phosphorus ion beam of fluence $\phi = 1 \times 10^{12}$ cm$^{-2}$ at energies in the range 30 keV $\div$ 180 keV Optical absorption data of TCDU monomer films polymerized by ion beams at conditions mentioned above are shown in the FIG. 3. The baseline for each spectrum is arbitrarily shifted. The relative intensities are truly represented in FIG. 3. From FIG. 3 it is clearly seen that larger optical absorption correspond to higher energies of irradiation. This is due to the fact that thicker layer of monomer is polymerized by higher energy ion beam resulting in more absorption. This demonstrates that the thickness of the polymerized layer can be controlled by the parameters of implantation.

Figure 4:
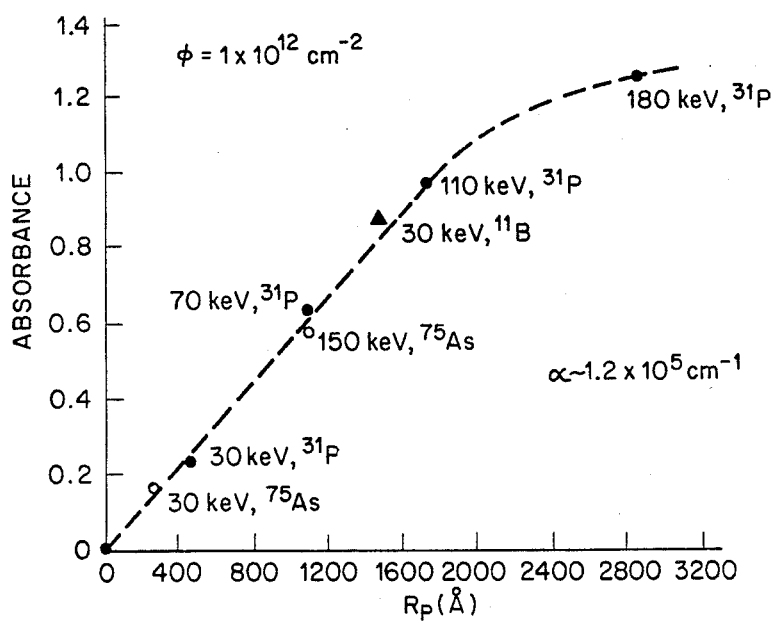
FIG. 4 is a curve of the absorbance of monomer films polymerized by ion beams of boron, phosphorus and arsenic at various energies of implantation versus the calculated penetration depth of these ions in accordance with the present invention.

EXAMPLE 4. Control of the thickness of polymerized part of the film and relation to depth penetration of ions FIG. 4 shows the dependence of absorbance (at $\lambda \sim 605$ nm) of monomer films polymerized by ion beams of boron, phosphorus and arsenic at various energies of implantation vs. The penetration depth of these ions calculated from LSS theory based on the density of TCDU $\simeq 1.4$ gm/cm$^3$. The fluence of implantation $\phi = 1 \times 10^{12}$ cm$^{-2}$ is the same for all samples. It is clearly seen from FIG. 4 that the absorbance depends linearly on penetration depth $R_p$ up to $R_p \sim 2000$ Å. Absorption coefficient $\alpha$ can be easily obtained from the linear part of FIG. 4 and is equal to $\alpha \simeq 1.2 \times 10^5$ cm$^{-2}$ which is a typical number for polydiacetylenes. The nonlinearity observed at deeper penetration depth of ions suggests that a calibration has to be one before the thickness of polymerized layers can be predicted for thicker polymerization layers.

The waveguides of the present invention and the methods for making them provide a unique product which precludes any chance of contamination of the interface of the core region (first region) and the cladding substrate region (second region). It also provides for a more uniform waveguide profile (step like interface) when compared to diffused waveguides (exponential depth profile). In addition the flexibility of the process to be able to make cores (first regions) having varied thicknesses is a decided advantage.

While there has been shown and described what is at present considered the preferred embodiment of the invention, it will be obvious to those skilled in the art that various changes and modifications may be made therein without departing from the scope of the invention as defined by the appended claims.

What is claimed is:

1. An optical waveguide comprising a unitary organic film having a first surface, an second surface, a thickness measured between said surfaces, a first region and a second region; said first region being a polydiacetylene film and said second region being a diacetylene monomer film; and said first region being contiguous with said second region and with said second region making up the totality of said thickness.

2. An optical waveguide in accordance with claim 1 wherein said diacetylene monomer film comprises bis-phenylurethane of 5,7-dodecadiyne-1,12-diol.

3. An optical waveguide in accordance with claim 1 wherein said first region having an index of refraction of about 2.2 and said second region having an index of refraction of about 1.65.

4. A method for making an optical waveguide comprising the following steps:

Step 1—depositing a diacetylene monomer film on a substrate, said film having a thickness and a surface; and Step 2—polymerizing the diacetylene monomer film by ion beam bombarding the surface of said film with ions to a predetermined controlled depth less than the thickness of said film, said ion beam being characterized by an ion mass and an accelerating voltage (energy) said predetermined depth of said polymerization being controlled by said ion mass and said accelerating voltage (energy) of said ion beam being applied.

5. A method for making an optical waveguide in accordance with claim 4 wherein said depositing being sufficient to obtain a diacetylene monomer film having a thickness of about 1 to about 10 microns.

6. A method of making an optical waveguide in accordance with claim 4 wherein said ion beam comprises an arsenic ion beam having an energy from about 30 keV to about 150 keV at a fluence of about $1 \times 10^{12} cm^{-2}$.

7. A method of making an optical waveguide in accordance with claim 4 wherein said ion beam comprises a boron ion beam having an energy of about 30 keV at a fluence of about $1 \times 10^{12} cm^{-2}$.

8. A method of making an optical waveguide in accordance with claim 4 wherein said ion beam comprises a phosphorus ion beam.

9. A method of making an optical waveguide in accordance with claim 8 wherein said phosphorus ion beam energy comprises from about 30 keV to about 180 keV at a fluence of about $1 \times 10^{12} cm^{-2}$.

10. A method of making an optical waveguide in accordance with claim 4 wherein said depth of polymerization is controlled to form a grating pattern at the interface between the two regions of the film.

* * * * *